United States Patent
Kashihara et al.

(10) Patent No.: US 7,551,533 B2
(45) Date of Patent: Jun. 23, 2009

(54) OPTICAL DISK, OPTICAL DISK DRIVE AND METHOD OF PLAYING BACK AN OPTICAL DISK

(75) Inventors: Yutaka Kashihara, Chigasaki (JP); Atsushi Ishihara, Yokohama (JP); Yuji Nagai, Sagamihara (JP); Taku Kato, Kamakura (JP); Yutaka Yamanaka, Tokyo (JP); Tatsunori Ide, Tokyo (JP)

(73) Assignees: Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 709 days.

(21) Appl. No.: 11/344,217

(22) Filed: Feb. 1, 2006

(65) Prior Publication Data

US 2006/0182428 A1 Aug. 17, 2006

(30) Foreign Application Priority Data

Feb. 2, 2005 (JP) .............................. 2005-026744

(51) Int. Cl.
 G11B 7/00 (2006.01)
(52) U.S. Cl. ................. 369/53.1; 369/53.22; 369/59.25
(58) Field of Classification Search ................ 369/47.1, 369/47.27, 53.1, 53.22, 275.3, 59.25
 See application file for complete search history.

(56) References Cited

U.S. PATENT DOCUMENTS

| 6,414,920 | B1 | 7/2002 | Lee |
| 6,608,804 | B2 * | 8/2003 | Shim ..................... 369/53.22 |
| 6,950,379 | B2 * | 9/2005 | Yen et al. .................. 369/52.1 |
| 2002/0060968 | A1 | 5/2002 | Senshu |
| 2002/0085466 | A1 | 7/2002 | Shim |
| 2003/0002410 | A1 | 1/2003 | Senshu |
| 2004/0032813 | A1 | 2/2004 | Lee et al. |
| 2004/0228244 | A1 | 11/2004 | Kim et al. |
| 2004/0246865 | A1 | 12/2004 | Kobayashi et al. |

FOREIGN PATENT DOCUMENTS

| EP | 1 102 263 A1 | 5/2001 |
| EP | 1 152 402 A1 | 11/2001 |
| EP | 1 191 531 A2 | 3/2002 |
| JP | 11-102576 | 4/1999 |
| JP | 2000-132903 | 5/2000 |
| JP | 2002-93059 | 3/2002 |
| JP | 2003-187535 | 7/2003 |
| JP | 2004-47056 | 2/2004 |
| JP | 2004-103078 | 4/2004 |
| TW | 535144 | 6/2003 |
| WO | WO 03/063148 A1 | 7/2003 |

* cited by examiner

*Primary Examiner*—Nabil Z Hindi
(74) *Attorney, Agent, or Firm*—Oblon, Spivak, McClelland, Maier & Neustadt, P.C.

(57) ABSTRACT

An optical disk that has a BCA, from which data can be reproduced even if the BCA has defects. The data format of the BCA comprises a plurality of sub-data units and coupling codes, each coupling two adjacent sub-data units. The sub-data units contain the same data. To reproduce the data, the sub-data units are checked for errors. The data recorded in any sub-data unit that has no errors is reproduced and output to a next stage circuit connected to the optical disk drive.

11 Claims, 4 Drawing Sheets

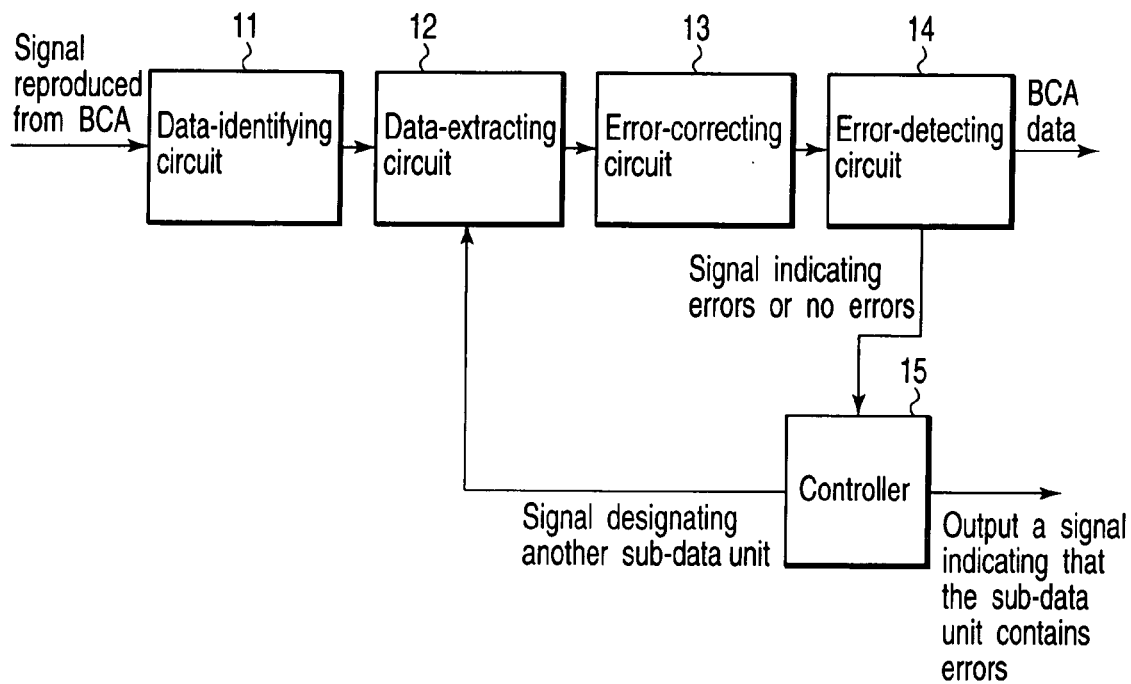
F I G. 2

OPTICAL DISK, OPTICAL DISK DRIVE AND METHOD OF PLAYING BACK AN OPTICAL DISK

CROSS-REFERENCE TO RELATED APPLICATIONS

This application is based upon and claims the benefit of priority from prior Japanese Patent Application No. 2005-026744, filed Feb. 2, 2005, the entire contents of which are incorporated herein by reference.

BACKGROUND OF THE INVENTION

1. Field of the Invention

The present invention relates to an optical disk, an optical disk drive, and a method of playing back an optical disk. More particularly, the invention relates to an optical disk having a burst cutting area (BCA) in which data can be recorded, and to improvements to means and method for reproducing data form the BCA.

2. Description of the Related Art

A digital versatile disk (DVD), i.e., a conventional optical disk, has a BCA in a region inner of the data-recording region in which ordinary data is recorded. Basic data that is used to play back the DVD is recorded in the BCA. The BCA has a track width and a bit length, both large enough to reproduce data from the DVD without adjusting the position of the optical head.

Assume that a user inserts a DVD into a DVD playback apparatus. The apparatus rotates the DVD at a predetermined speed. In the DVD playback apparatus, the optical head emitting a laser beam is moved in the radial direction of the DVD to the data-recording region of the DVD. Focus servo control is thereby performed in the data-recording region. The optical head then scans the BCA, reproducing the data recorded in the BCA. The data is used to reproduce ordinary data recorded in the data-recording region. No tracking servo control is performed to playback the BCA. The BCA is an inner circular track provided on the DVD. The data recorded in the BCA has a fixed data format.

BRIEF SUMMARY OF THE INVENTION

The conventional DVD is disadvantageous in two respects. First, if its BCA has prominent defects such as scratches, no DVD playback apparatuses can reproduce the data recorded in the BCA. Second, only a small part of the BCA holds data, with the remaining, greater part padded and not used. This invention has been made to eliminate these disadvantages.

An object of this invention is to provide an optical disk that has a BCA which can be used in its entirety, and from which necessary data can be reproduced even if uncorrectable defects exist in a part of the BCA. Another object of the invention is to provide an optical disk drive that can reproduce data from the BCA of an optical disk even if the BCA has defects. Still another object of the invention is to provide a method of playing back an optical disk even if the BCA of the disk has defects.

According to an aspect of the present invention, there is provided an optical disk that has a burst cutting area (BCA) having a data format. The data format comprises: a plurality of sub-data units, each having a preamble, data, an error-detecting code, error-correcting codes, a postamble and sync codes; and a code arranged between two adjacent sub-data units and coupling the two adjacent sub-data units.

According to another aspect of the present invention, there is provided an optical disk drive for driving an optical disk of the type described above. The optical disk drive comprises: means for identifying a signal reproduced from the burst cutting area; extracting means for extracting a desired sub-data unit from the burst cutting area in accordance with an instruction supplied from an external apparatus; error-correcting means; error-detecting unit; and a controller for controlling the extracting means and informing a next circuit of generation of errros, when the error-detecting unit detects the errors in the sub-data unit extracted.

According to still another aspect of the present invention, there is provided a method of playing back an optical disk of the type described above. The method comprises: identifying a signal reproduced from the burst cutting area; desiganting a sub-data unit to be extracted, in accrodance with the signal identified; extracting the sub-data unit designated; correcting the sub-data unit extracted; detecting errors in the sub-data unit corrected; determining whether a number of errors detected exceeds a preset value, from a result of the detecting errors; transmitting the data if the number of errors does not exceeds the preset value; and switching (S10) the sub-data unit to another sub-data unit to be extracted, if the the number of errors exceeds the preset value.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing the major components of an optical disk drive, which is another embodiment of the invention;

DETAILED DESCRIPTION OF THE INVENTION

An optical disk, an optical disk drive, and a method of playing back an optical disk, which are embodiments of the present invention, will be described with reference to the accompanying drawings.

Figure 1:
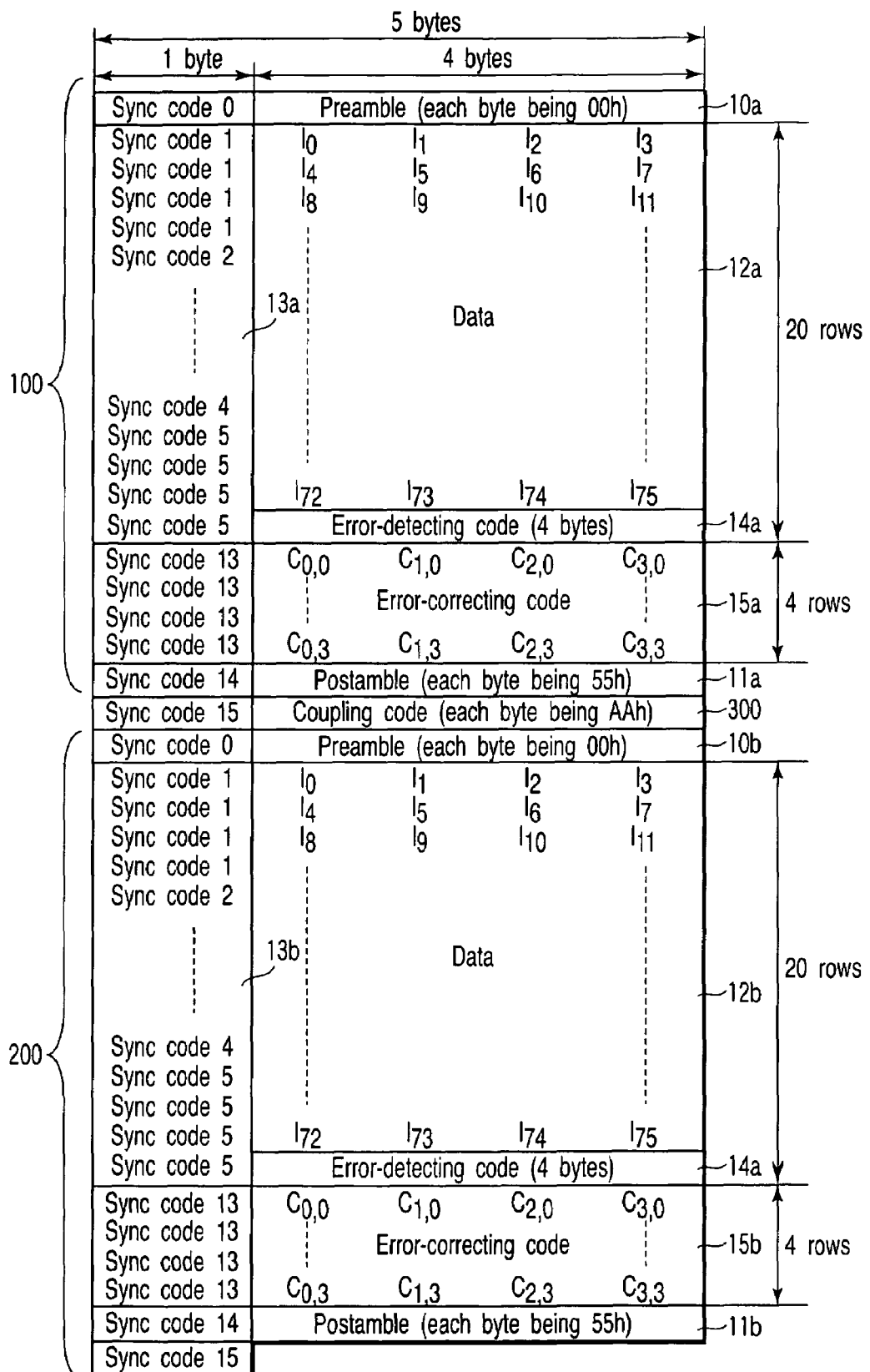
FIG. 1 is a diagram illustrating a BCA data format that an optical disk according to an embodiment of the invention may have.
Figure 3:
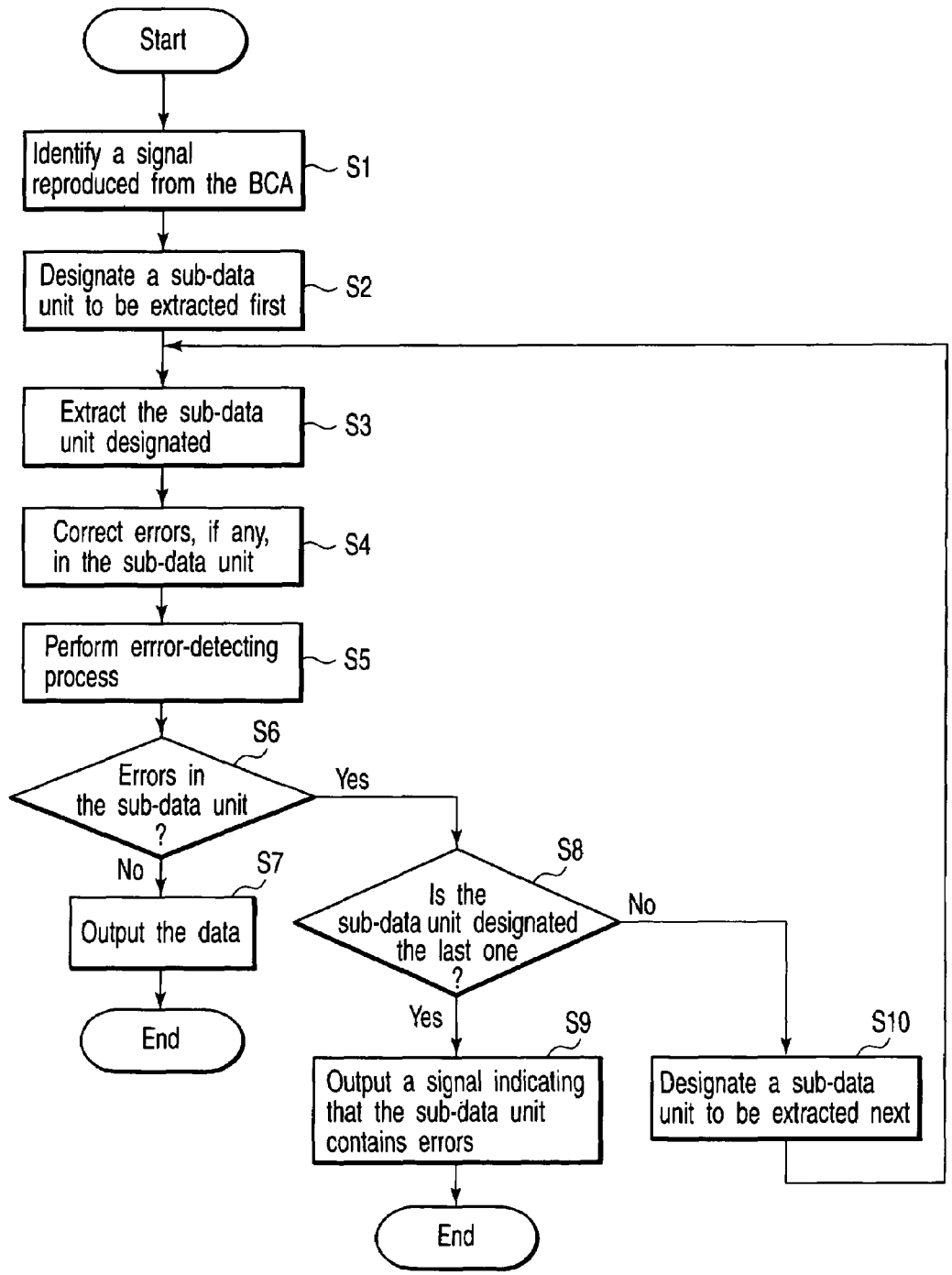
FIG. 3 is a flowchart explaining the major steps of a method of playing back an optical disk, which is still another embodiment of this invention.

FIG. 1 shows a data format of an optical disk according to this invention. FIG. 2 is a block diagram of an optical disk drive, which is another embodiment of the invention. FIG. 3 is a flowchart explaining a method of playing back an optical disk, which is still another embodiment of this invention. To compare the optical disk of this invention with the conventional optical disk in terms of BCA data format, the BCA data format of the latter will be first described, with reference to FIG. 4.

Figure 4:
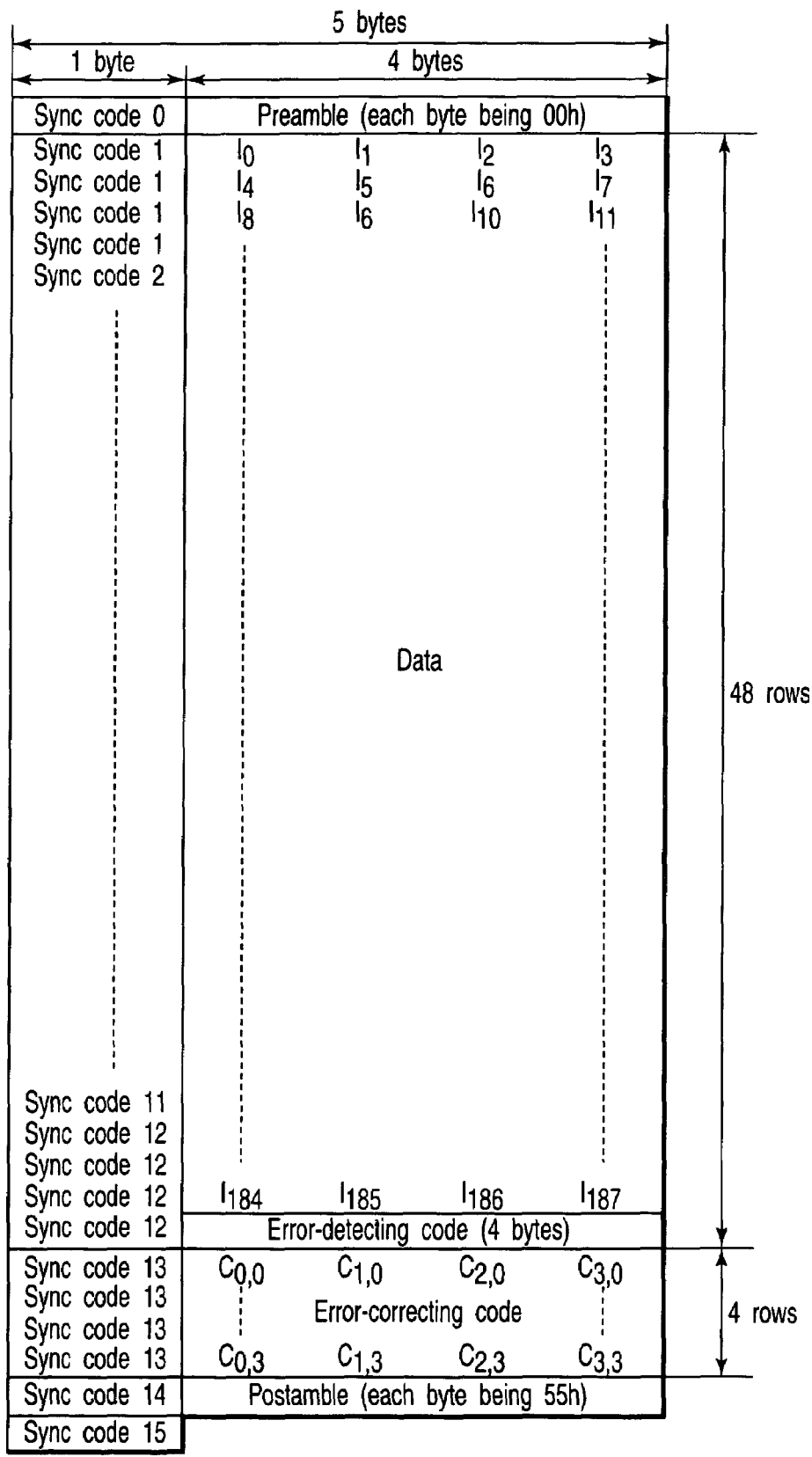
FIG. 4 is diagram depicting the BCA data format of the conventional optical disk.

As FIG. 4 shows, the data recorded in the BCA includes a preamble, a postamble, data, sync codes, an error-detecting codes, and four error-correcting codes. Each sync code (1 byte) pertains to five bytes, including itself. There are sixteen (16) types of sync codes, which are code 0 to code 15. Sync code 0 is at the head of the BCA data format and is allocated to the preamble. The preamble consists of four bytes, each byte being 00 (hexadecimal). Sync codes 1 to 12 are allocated to each 16-byte data unit consisting of data and an error-detecting code.

If the data is less than 188 bytes (4 bytes×47 rows), the bytes other than those defining the data are all 00 (hexadecimal). Thus, the data is apparently fixed at the amount of 188 bytes. Four sync codes 13 are allocated to the four error-correcting codes, respectively. Sync code 14 follows the fourth error-correcting code and is allocated to the postamble. The postamble consists of four bytes, each byte being 55 (hexadecimal). Sync code 15, or the last sync code, is the last item of the BCA data format.

The conventional DVD playback apparatus detects the BCA upon receiving sync code 0 or both sync code 0 and preamble. Then, the apparatus uses sync codes 1 to 13, reading the data, error-detecting code and error-correcting codes and storing them in the memory provided in it. When the apparatus receives sync code 14, postamble, or sync code 15, or any combinations of these, it detects that the data, error-detecting code and error-correcting codes have been stored into the memory.

Using the error-correcting codes, the apparatus corrects the data stored in the memory. From the error-detecting code, the apparatus determines whether the data contains errors. If the data contains no errors, the data that has been corrected is supplied to a next circuit (not shown). If the data contains errors, the data indicating this is supplied to the external apparatus.

As indicated above, the BCA of the conventional DVD is an inner circular track and can record 188 bytes at most. In practice, however, only a small part of the BCA is used, and the remaining, greater part is padded and not used. In view of this, the BCA of an optical disk according to this invention is so formatted as will be described below.

The BCA data format of the optical disk according to this invention will be described with reference to FIG. 1. As FIG. 1 shows, the data format is composed of two sub-data units (100,200) (also called sub-data regions) and a coupling code (300) that couples the sub-data units (100,200). That is, the coupling code (300) arranged between two adjacent sub-data units (100,200) couples these two adjacent sub-data units (100,200).

The sub-data units (100,200) are similar in structure to the BCA data format of the conventional DVD. Namely, each sub-data unit (100,200) contains a preamble (10*a*,10*b*), a postamble (11*a*,11*b*), data (12*a*,12*b*), sync codes (13*a*,13*b*), an error-detecting codes (14*a*,14*b*), and four error-correcting codes (15*a*,15*b*). Each sync code (1 byte) pertains to five bytes, including itself. Nine types of sync codes, i.e., code 0 to code 5 and codes 13 to 15, are available.

These sync codes are arranged, forming a column of bits, which is similar to the column illustrated in FIG. 4. In each sub-data unit, sync code 0 is at the head and is allocated to the preamble. The preamble consists of four bytes, each byte being 00 (hexadecimal). Sync codes 1 to 5 are allocated to the data and the error-detecting code. More precisely, four sync codes of the same type are allocated to 16 bytes of data. Of four sync codes 5, however, the first three are allocated to 12 bytes of data, and the last is allocated to the error-detecting code (4 bytes).

If the data is smaller than 76 bytes (4 bytes×19 rows), the bytes other than those defining the data are all 00 (hexadecimal). Thus, the data is apparently fixed at the amount of 76 bytes. Four sync codes 13 are allocated to the four error-correcting codes, respectively. Sync code 14 follows the fourth error-correcting code and is allocated to the postamble. The postamble consists of four bytes, each byte being 55 (hexadecimal). Sync code 14 is the last item of the BCA data format of the sub-data unit.

The two sub-data units are identical. In other words, their contents are identical.

The coupling code coupling two sub-data units consists of four bytes, each byte being AA (hexadecimal). Thus, the sub-data units combined are similar to the BCA data format of the conventional DVD in that each sync code pertains five bytes, including itself.

The four bytes forming the coupling code need not be all AA (hexadecimal). The coupling code needs only to differ from the preamble and the postamble. Nonetheless, it should better consist of four bytes, each being AA (hexadecimal). This is because it much differs from the postamble consisting of four bytes 55, each byte being 00 (hexadecimal). Namely, AA (10101010) is exactly inverse to 55 (10101010) in positions of 1s and 0s.

The BCA data format according to this embodiment has two sub-data units. Alternatively, it may have three or more sub-data units. If so, the sub-data units are reduced in size because the size of the BCA is fixed. In practice, it is desired that the format have two sub-data units.

The sub-data units recorded in the BCA of the optical disk according to this invention are identical in basic structure to the BCA data format of the DVD. The conventional DVD playback apparatus can therefore reproduce one of the sub-data units recorded in the optical disk of this invention.

As indicated above, the two sub-data units are identical in content. Nevertheless, they may differ in content in some cases. For example, only one of the sub-data units may contain the data representing the type of the disk, while both sub-data units contain the same important data such as copy-protection information.

If three or more sub-data units are recorded in the BCA, each sub-data unit may be too small to contain data of a specific size. In this case, the data may be divided into parts, which are recorded in two or more sub-data units. If the BCA have, for example, four sub-data units, two sub-units may be used as a first set, and the other two sub-units may be used as a second set.

An optical disk drive which is another embodiment of the invention will be described, with reference to FIG. 2 that is a block diagram. As FIG. 2 shows, the optical disk drive has an optical head (not shown), a data-identifying circuit 11, a data-extracting circuit 12, an error-correcting circuit 13, an error-detecting circuit 14, and a controller 15.

The optical head scans the BCA of an optical disk, generating a data signal. The signal-identifying circuit 11 converts the data signal to binary data, which is supplied to a data-extracting circuit 12. The circuit 12 extracts one of the sub-data units from the BCA, in accordance with an instruction supplied from the controller 15. The error-correcting circuit 13 corrects the data by using the error-correcting codes recorded in the sub-data unit extracted by the data-extracting circuit 12. The data thus corrected is supplied to the error-detecting circuit 14. The error-detecting circuit 14 detects errors, if any, in the the data and generates a signal indicating whether errors have been detected. This signal is supplied to the controller 15.

If the data output from the error-correcting circuit 13 contains no errors, the data is supplied to a next circuit (not shown). If the data contains errors, the controller 15 gives a signal desiganting another sub-data unit to extract, to the data-extracting circuit 12. Error correction and error detection is performed on the other sub-data unit, too, in the same way. The controller 15 is informed as to whether or not the other sub-data unit contains errors. The data-extracting circuit 12, error-correcting circuit 13 and error-detecting circuit 14 repeatedly perform their functions until a sub-data unit having no errors is detected. If all sub-data units recorded in the BCA have errors, the controller 15 gives a signal indicating this fact, to an external apparatus.

A method of playing back an optical disk according to this invention will be described, with reference to the flowchart of FIG. 3. First, a signal reproduced from the BCA of the optical disk is identified in Step S1. In Step S2, a sub-data unit is designated to be extracted first. In Step S3, the sub-data unit is extracted. Errors, if any, in the sub-data unit are corrected in Step S4. A error-detecting process is carried out in Step S5. That is, a process is carried out to determine whether errors exist or not, from the result of error detecting.

Next, in Step S6, it is determined whether the first sub-data unit contains errors. If No, the data in the sub-data unit is output. The process of playing back the optical disk is terminated. That is, the data is transmitted if the number of errors is less than the preset value. If Yes, the process goes to Step S8. In Step S8, it is determined whether the sub-data unit designated is the last one. If No, the process goes to Step S10, in which a next sub-data unit is designated to be extracted next. That is, the sub-data unit is switched to another sub-data unit to be extracted if the number of errors exceeds the preset value. The process then returns to Step S3, in which the nest sub-data unit is extracted.

If Yes in Step S8, a signal indicating that the sub-data unit contains errors is output in Step S9. In this case, too, the optical disk is terminated.

As has been described, if the data contained in one sub-data unit cannot be reproduced because the BCA has defects, data recorded contained in another sub-data unit can be reproduced in the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk having a center hole and a burst cutting area (BCA) which is a circular region surrounding the center hole and which has a data format comprising:
   a plurality of sub-data units, each having a preamble, data, an error-detecting code, error-correcting codes, a postamble and sync codes; and
   a coupling code arranged between two adjacent sub-data units and coupling the two adjacent sub-data units.

2. The optical disk according to claim 1, wherein the sub-data units are a first sub-data unit and a second sub-data unit, the postamble of the first sub-data unit is 55 h (h: hexadecimal), the coupling code coupling the first and second sub-data units is AAh, and the preamble of the second sub-data unit is 00 h.

3. The optical disk according to claim 1, wherein the sub-data units have identical data pieces.

4. The optical disk according to claim 1, wherein the sub-data units have different data pieces.

5. The optical disk according to claim 1, wherein the data to be recorded is divided into data pieces which are distributed into the sub-data unit area.

6. An optical disk drive for driving an optical disk having a center hole and a burst cutting area which is a circular region surrounding the center hole and which has a data format comprising a plurality of sub-data units, each having a preamble, data, an error-detecting code, error-correcting codes, a postamble and sync codes; and a coupling code arranged between two adjacent sub-data units and coupling the two adjacent sub-data units, said optical disk drive comprising:
   means for identifying a signal reproduced from the burst cutting area;
   extracting means for extracting a desired sub-data unit from the burst cutting area in accordance with an instruction supplied from an external apparatus;
   error-correcting means for correcting the sub-data unit extracted;
   error-detecting unit for detecting errors in the sub-data unit corrected; and
   a controller for controlling the extracting means and informing a next circuit of generation of errors when the error-detecting unit detects errors in the sub-data unit extracted.

7. The optical disk drive according to claim 6, wherein the extracting means extracts another sub-data unit in accordance with an instruction supplied from the controller when the error-detecting unit detects errors in the sub-data unit extracted.

8. The optical disk drive according to claim 6, wherein the extracting means extracts other sub-data units in accordance with an instruction supplied from the controller until the error-detecting unit detects a sub-data unit that contains no errors or detects that all sub-data units contains errors.

9. A method of playing back an optical disk having a center hole and a burst cutting area (BCA) which is a circular region surrounding the center hole and which has a data format comprising a plurality of sub-data units, each having a preamble, data, an error-detecting code, error-correcting codes, a postamble and sync codes; and a coupling code arranged between two adjacent sub-data units and coupling the two adjacent sub-data units, said method comprising:
   identifying a signal reproduced from the burst cutting area;
   designating a sub-data unit to be extracted, in accordance with the signal identified;
   extracting the sub-data unit designated;
   correcting the sub-data unit extracted;
   detecting errors in the sub-data unit corrected;
   determining whether errors exist, from a result of the detecting errors;
   transmitting the data if the number of errors does not exceed the preset value; and
   switching the sub-data unit to another sub-data unit to be extracted, if the number of errors exceeds the preset value.

10. The method according to claim 9, which further comprises determining whether the sub-data unit extracted is the last, if the number of errors exceeds the preset value, and in which the sub-data unit is switched another sub-data unit if the sub-data unit extracted is not the last.

11. The method according to claim 9, further comprising:
   determining whether the sub-data unit extracted is the last, if the number of errors exceeds the preset value; and
   generating a signal indicating that errors have occurred, if the sub-data unit extracted is the last.

* * * * *